Aug. 11, 1953  A. Y. DODGE  2,648,403
BRAKE
Filed May 25, 1948  2 Sheets-Sheet 2
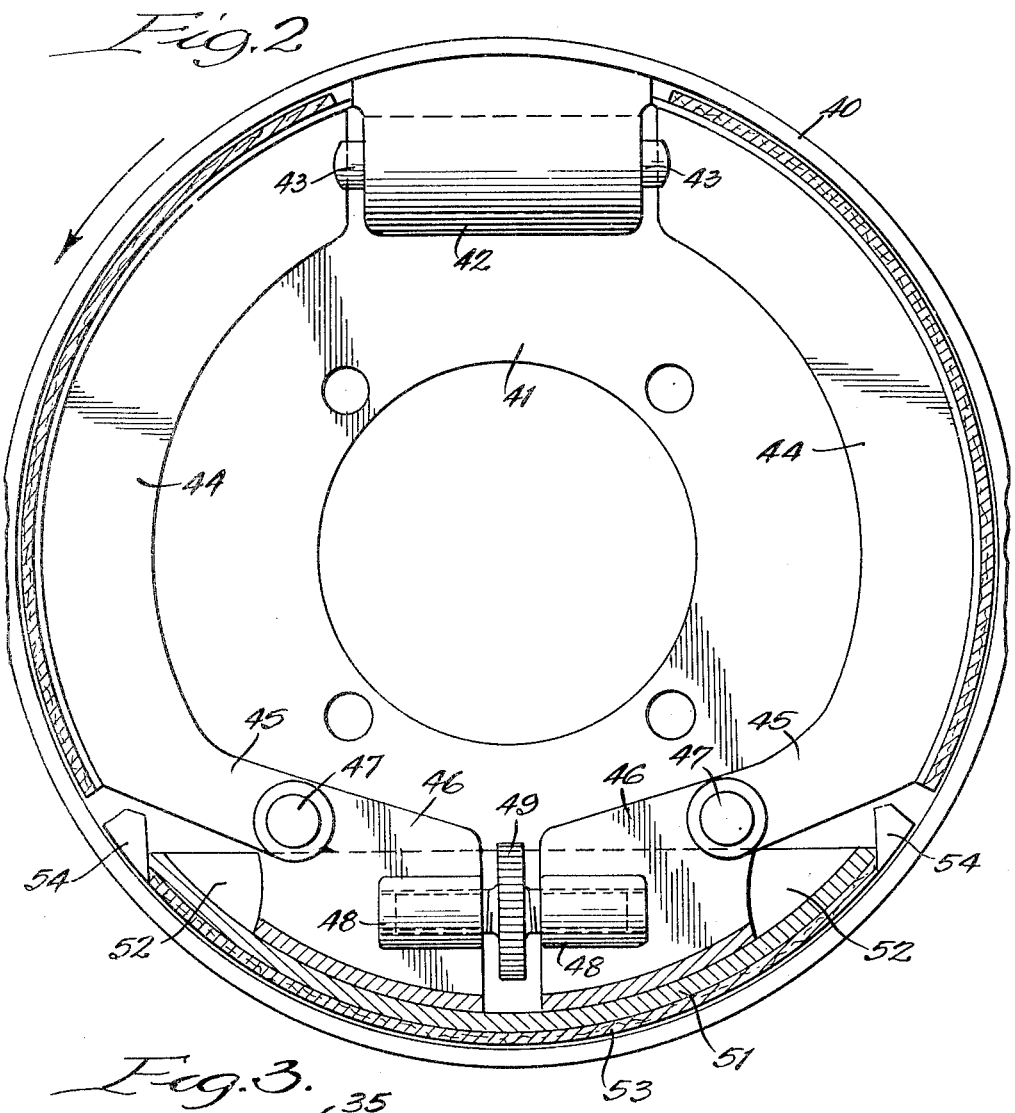
Fig.2
Fig.3
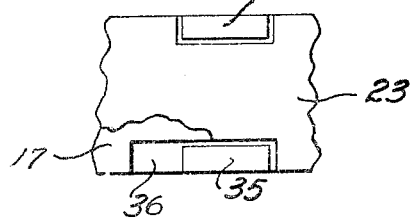
Inventor:
Adiel Y. Dodge,
By Dawson, Ooms, Booth & Spangenberg,
Attorneys.

Patented Aug. 11, 1953

2,648,403

UNITED STATES PATENT OFFICE 2,648,403

BRAKE

Adiel Y. Dodge, Rockford, Ill.

Application May 25, 1948, Serial No. 29,093

9 Claims. (Cl. 188—78)

1

This invention relates to brakes and more particularly to brakes of the type adapted for use with automotive vehicles.

In connection with such brakes, I have heretofore proposed operation of the brake segments or shoes by flexible bands or an articulated linkage lying within the segments. As samples of such brakes, reference is made to my Patents No. 2,206,742 and No. 2,263,263 and my copending applications Serial No. 693,642 filed August 29, 1946, now matured into Patent No. 2,596,379 issued May 13, 1952, and Serial No. 722,836 filed January 18, 1947, now matured into Patent No. 2,508,105 issued May 16, 1950. The present invention relates to improvements in brakes of the type generally similar to those shown in my prior patents and applications.

One of the objects of the invention is to provide a brake which is extremely simple and inexpensive to construct and assemble and which is highly efficient in use.

Another object is to provide a brake in which a desired degree of self-actuation or servo action can be obtained. Preferably the end segments or shoes have a direct servo action on each other in opposite directions of rotation and act on a flexible operating mechanism for the intermediate segments or shoes.

Still another object is to provide a brake in which the end segments are formed by attaching friction lining material directly to a flexible operating band and one or more intermediate segments loosely overlie the central portion of the band to be moved thereby. In this construction the band engages abutments adjacent its ends, and separate abutments are provided for the intermediate segment.

A further object is to provide a brake in which rigid end segments are interconnected by an articulated linkage and an intermediate segment overlies the linkage to be actuated thereby. According to one feature of the invention, the linkage may be made adjustable to adjust the brake clearance.

The above and other objects and advantages of the invention will be more readily apparent when read in connection with the accompanying drawings, in which—

Figure 2 is a similar view of an alternative form of brake; and

Figure 3 is a partial view of Figure 1 showing the abutment for the intermediate segment.

Figure 1:
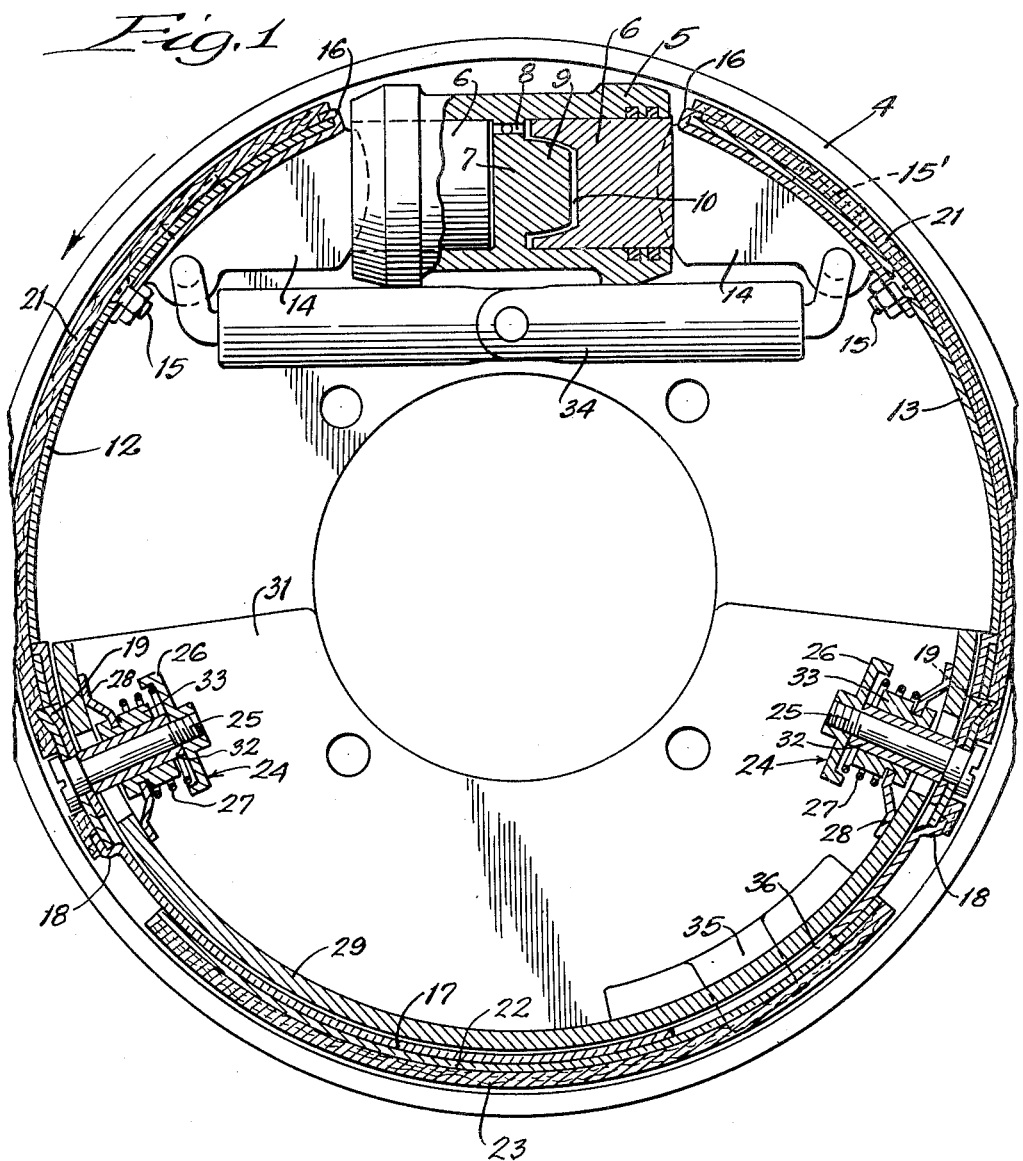
Figure 1 is a transverse section with parts in elevation of one form of brake embodying the invention.

The brake as shown in Figure 1 is generally similar to one of the embodiments illustrated in my copending application Serial No. 722,836, filed January 18, 1947, now Patent 2,508,105 issued May 16, 1950, and to this extent the present application is a continuation in part of

2 said copending application. As shown, the brake is adapted for use with a conventional brake drum 4 having a cylindrical drum portion and which may be attached to the wheel of a vehicle. Actuating mechanism shown as a hydraulic cylinder 5 is rigidly mounted on a fixed support within the drum and slidably carries oppositely facing pistons 6. When fluid is forced into the central portion of the cylinder, the pistons will expand outward to engage the brake.

The cylinder and pistons are preferably constructed as more particularly described and claimed in my copending application Serial No. 37,033, filed July 3, 1948, now matured into Patent No. 2,603,952 issued July 22, 1952, to form abutments for the operating mechanism and to cushion the operation to prevent click. For this purpose the cylinder is formed with a central cross partition 7 therein having a bore 8 therethrough. The bore communicates with an inlet passage for brake operating fluid leading from the usual master cylinder. On its opposite sides the partition carries curved tapered projections 9 fitting into similarly shaped cavities 10 in the piston ends.

When fluid is forced into the cylinder, both pistons are moved outward and the cavities therein are filled with fluid. As the brake load is applied, one of the pistons is forced back into the cylinder but this motion is cushioned by the fluid in the cavity which must be forced out around the projection 9. Thus the piston will move gradually to its maximum inner position seated against the partition 7 without shock or click to serve as an abutment for the operating mechanism.

The pistons are adapted to expand a flexible operating band which may be formed of a relatively thin strip of metal. The band is preferably formed of an aluminum alloy having a relatively high rate of thermal expansion so that it will compensate at least in part for thermal expansion of the drum. As shown, the band is formed in three sections, the two end sections 12 and 13 being substantially identical and formed of relatively thin strips of metal. Adjacent their ends the band sections 12 and 13 carry abutment members having inwardly extending flanges 14 which may be secured to the bands by riveting or detachably by bolts 15. The abutment members may also have outwardly extending side flanges 15' which fit over the sides of the band sections and hook portions 16 which hook over the ends of the bands. The flanges 14 engage the pistons in the cylinder 5 and are preferably slidable radially relative thereto so that the segments can move into engagement with the drum. Adjacent their opposite ends the band sections 12 and 13 are cut and pressed outward, as shown, for connection to an intermediate band section 17 similarly formed of a relatively thin strip of steel or the like. The band section 17 has offset hook portions 18 spaced from its ends to hook over the ends of the band sections 12 and 13, as shown, and may also be cut at points spaced from its ends and bent outward to form outwardly extending tooth portions 19 to enter corresponding openings in the band sections 12 and 13 formed by cutting and pressing the band sections outward as explained above. In addition the ends of the section 17 may be bent outward to enter openings in the band sections 12 and 13 as shown. When so connected the band sections form, in effect, a continuous flexible operating band.

The band sections 12 and 13 have directly secured thereto friction lining material 21 to form with the band sections flexible brake segments. A separate intermediate segment similar to the segments 12 and 13 and including a flexible backing strip 22 and an overlying strip of friction material 23 overlies the central portion 17 of the band, as shown.

The band is normally urged away from the drum 4 to release the brake by a plurality of return spring devices which are preferably constructed as more particularly described and claimed in my copending application Serial No. 693,642, filed August 29, 1946, now Patent 2,596,-379, issued May 13, 1952, to provide for automatic adjustment of the brake. As shown, two such devices indicated generally at 24 are provided adjacent the points of connection of the band segment 17 with the band sections 12 and 13. Each such device comprises a pin 25 extending through the band section and having an enlarged cap 26 thereon. The enlarged cap 26 engages a spring 27 seating against a plate 28 which engages a partially cylindrical flange 29 on a supporting plate 31. It will be understood that the plate 31 forms a part of a stationary support which also carries the cylinder 5 and which may be the usual backing plate. The pin 25 carries a sleeve 32 fitting frictionally within a sleeve or collar 33 which is carried by the plate 28 to have a limited amount of lost motion relative thereto. During normal brake application the collar 33 will move with the sleeve 32 to take up its lost motion relative to the plate 28. However, as the brake wears and a greater amount of travel is required for a brake application, the sleeve 32 will slide in the collar 33 to a new position such that upon release of the brake the brake clearance will be maintained at the desired value.

The ends of the band are urged inward by a spring return and automatic adjusting device indicated generally at 34 which is connected to the flanges 14. The device 34 may be internally constructed as disclosed in my said application Serial No. 693,642, now Patent 2,596,379, issued May 13, 1952, and is not shown in detail herein.

As explained above, the actuating cylinder 5 forms an abutment for the ends of the band and for the segments provided thereby to limit circumferential movement of the band in response to friction drag of the drum. The intermediate segment 22 engages an abutment 35 carried by the support and extending outwardly therefrom through an elongated opening 36 in the band section 17. Beyond the band section 17 the abutment 35 fits into an opening or notch in the segment strip 22 to limit circumferential travel of the intermediate segment. It will be noted that the abutment 35 is located closer to one end of the intermediate segment than the other to provide a greater degree of self-actuation in the forward direction of travel than in reverse although this is not essential.

In operation of the brake with the drum turning counter-clockwise as indicated by the arrow, the segment formed by strip 12 when the band is expanded will transmit a tangential load to the band section 17 and through it to the segment formed by the band section 13. The end of the band section 13 will engage the cylinder 5 which acts as an abutment therefor, and due to the spreading action of the cylinder on the band end and tangential force transmitted to the band by the first segment, the central portion 17 of the band will expand radially to press the intermediate segment against the drum. In this direction of rotation since the abutment 35 is toward the trailing end of the second segment, the second segment will have a relatively high degree of self-actuation. In the opposite direction of rotation the second segment will have a slightly less degree of self-actuation, but otherwise the brake is equally effective and functions in the same manner.

It will be noted that any parts of the brake as described can readily be removed and replaced in case of wear or damage thereto. The flange portions 14 can easily be detached from the band sections 12 and 13 and attached to new sections having new lining material thereon. Replacement of these sections does not necessarily disturb the central band section 17 which can be removed and reattached to the new sections simply by removing the pins 25. The intermediate segment can easily be released when required simply by lifting it out and inserting a new segment in its place.

Figure 2 illustrates a brake having similar operating characteristics and advantages but employing rigid end segments or shoes. As shown, this brake comprises a cylindrical drum 40 adjacent which is mounted a fixed support 41 to carry the brake mechanism. A cylinder 42 is mounted on the support 41 and carries oppositely acting pistons having projecting piston rods 43 to engage the adjacent brake segments.

A pair of identical rigid segments or shoes 44 are mounted on opposite sides of the cylinder 42 with their ends engaging the piston rods 43, as shown. At their opposite ends the segments 44 terminate in extensions 45 at their inner edges.

The segments 44 are connected by an articulated linkage shown as comprising a pair of rigid link members 46 which are pivoted respectively to the extensions 45 at 47. The link members 46 are adjustably connected by a screw having threads of opposite hand at its opposite ends threaded into sockets 48 on the link members. Preferably an enlarged knurled wheel 49 is provided by which the linkage can easily be adjusted to adjust the brake.

Overlying the linkage members 46 is an intermediate brake segment formed by a channel shaped section 51 reinforced by edge flanges 52 and having friction lining material 53 thereon. The ends of the intermediate segment engage fixed abutments 54 on the support to limit circumferential movement thereof while permitting free radial movement.

In operation the leading shoe 44 with respect to the direction of drum rotation transmits tangential force through the linkage to the trailing shoe 44 which abuts against the cylinder 42. Radial outward movement of the leading and trailing segments and the connecting linkage due to the operation of the hydraulic pistons and the tangential force imparted thereto by the leading segment causes the linkage to move the intermediate segment outward into contact with the drum. When the hydraulic pressure is released, the segments will be returned by suitable return spring devices, not shown.

In the event of wear, the brake clearance can easily be adjusted by turning the knob 49 to increase the effective length of the linkage and move the several segments outward. For replacement any one or all of the segments can easily be removed simply by disconnecting the pivots 47 and reconnecting the linkage to new end segments. In the case of the intermediate segment, it merely needs to be lifted out and replaced by a new segment in the assembly.

While two embodiments of the invention have been shown and described in detail herein, it will be understood that they are illustrative only and are not to be taken as a definition of the scope of the invention, reference being had for this purpose to the appended claims.

What is claimed is:

1. A brake comprising a support, an actuating device carried by the support, a pair of rigid brake segments movably carried by the support on opposite sides of the actuating device with one end of each segment engaging the actuating device to be spread by the actuating device and the other ends of the segments being circumferentially spaced, a third segment between the other ends of said pair of rigid segments, an abutment on the support engaging the third segment to limit circumferential movement thereof, and an articulated linkage detachably pivotally connected to the ends of the rigid segments and loosely underlying the third segment.

2. A brake comprising a support, an actuating device on the support, a pair of rigid brake segments carried by the support on opposite sides of the actuating device to be spread by the actuating device, a third segment between said pair of rigid segments, an abutment on the support engaging the third segment, and an articulated linkage connecting the ends of the rigid segments and loosely underlying the third segment, said linkage including a pair of link members pivoted to the rigid segments respectively, and an adjustable connection between the link members to vary the effective length of the linkage.

3. A brake comprising a support, three brake segments movably carried by the support, an actuating device on the support engaging the adjacent ends of the first and third segments to separate them, a circumferentially elongated operating member detachably connected at its ends to the first and third segments and loosely underlying the second segment and movable circumferentially relative to the second segment, and an abutment on the support engaging the second segment to limit circumferential movement thereof.

4. A brake comprising a support, three brake segments movably carried by the support, an actuating device on the support engaging the adjacent ends of the first and third segments to separate them, angularly flexible means detachably connected at its ends to the first and third segments and slidably engaging the inner surface of the second segment, and an abutment on the support engaging the second segment to limit circumferential movement thereof.

5. A brake comprising a support, actuating means carried by the support, a pair of arcuately curved brake segments movably mounted on the support, one end of each brake segment engaging the actuating means and the other ends of the segments being circumferentially spaced, an operating member detachably connected at its ends to said other ends of the segments, an intermediate segment slidably overlying the operating member, and an abutment on the support engaging the intermediate segment to limit circumferential movement thereof.

6. A brake comprising a support, actuating means carried by the support, a pair of arcuately curved brake segments movably mounted on the support, one end of each brake segment engaging the actuating means and the other ends of the segments being circumferentially spaced, an operating member detachably connected at its ends to said other ends of the segments, an intermediate segment slidably overlying the operating member, and an abutment on the support engaging the intermediate segment to limit the circumferential movement thereof, said abutment engaging the intermediate segment intermediate its ends but closer to one end than to the other whereby the intermediate segment has a greater degree of self actuation in one direction than in the other.

7. The construction of claim 5 in which the operating member is a flexible strip.

8. A brake comprising a support, actuating means carried by the support, a pair of arcuately curved brake segments movably mounted on the support, one end of each brake segment engaging the actuating means and the other ends of the segments being circumferentially spaced, each segment including a relatively thin metal backing strip and friction lining on the outer surface of the backing strip, a thin metal operating strip to connect the segments, the backing strips and the operating strip being formed with punched out interengaging parts detachably to connect the ends of the operating strip to said other ends of the segments, an intermediate segment slidably overlying the operating strip, and an abutment on the support engaging the intermediate segment to limit circumferential movement thereof.

9. The brake comprising a support, actuating means carried by the support, a pair of arcuately curved brake segments movably mounted on the support, one end of each brake segment engaging the actuating means and the other ends of the segments being circumferentially spaced, an operating member detachably connected at its ends to said other ends of the segments, an intermediate segment slidably overlying the operating member, and an abutment on the support engaging the intermediate segment to limit circumferential movement thereof, said operating member comprising a linkage pivotally connected at its ends to said other ends of the first named segments respectively.

ADIEL Y. DODGE.

References Cited in the file of this patent

UNITED STATES PATENTS

| Number | Name | Date |
| --- | --- | --- |
| 1,758,066 | Sneed | May 13, 1930 |
| 1,774,565 | Price | Sept. 2, 1930 |
| 1,786,461 | Stoner | Dec. 30, 1930 |
| 1,928,078 | Taylor | Sept. 26, 1933 |
| 2,060,875 | La Brie | Nov. 17, 1936 |
| 2,206,742 | Dodge | July 2, 1940 |
| 2,508,105 | Dodge | May 16, 1950 |